United States Patent
Wang et al.

(10) Patent No.: US 10,271,184 B2
(45) Date of Patent: Apr. 23, 2019

(54) METHOD AND APPARATUS OF DELIVERING THE TRIGGER REPORT FOR MACHINE TYPE COMMUNICATIONS

(71) Applicant: Alcatel Lucent, Boulogne-Billancourt (FR)

(72) Inventors: Zhi Wang, Shanghai (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 225 days.

(21) Appl. No.: 15/103,123

(22) PCT Filed: Dec. 30, 2014

(86) PCT No.: PCT/IB2014/003139
§ 371 (c)(1),
(2) Date: Jun. 9, 2016

(87) PCT Pub. No.: WO2015/104578
PCT Pub. Date: Jul. 16, 2015

(65) Prior Publication Data
US 2018/0139588 A1    May 17, 2018

(30) Foreign Application Priority Data

Jan. 8, 2014  (CN) .......................... 2014 1 0008565

(51) Int. Cl.
*H04W 4/00*  (2018.01)
*H04W 4/14*  (2009.01)
(Continued)

(52) U.S. Cl.
CPC .............. *H04W 4/14* (2013.01); *H04W 4/18* (2013.01); *H04W 4/70* (2018.02); *H04W 28/06* (2013.01)

(58) Field of Classification Search
CPC ........... H04W 4/14; H04W 4/70; H04W 4/18; H04W 28/06
See application file for complete search history.

(56) References Cited

U.S. PATENT DOCUMENTS

2012/0257571 A1   10/2012  Liao
2013/0303205 A1   11/2013  Boylan et al.
(Continued)

FOREIGN PATENT DOCUMENTS

CN    103200553 A    7/2013
EP      2642776 A1    9/2013
(Continued)

OTHER PUBLICATIONS

Huawei et al: "Reverse Trigger Flow", 3GPP Draft; S2-120711, 3rd Generation Partnership Project (3GPP), Mobile Competence Centre; 650, Route Des Lucioles; F-06921 Sophia-Antipolis Cedex; France, vol. SA WG2, No. Vancouver, Canada; Feb. 6-Feb. 10, 2012, Jan. 31, 2012 (Jan. 31, 2012), XP050576573.
(Continued)

*Primary Examiner* — Khai M Nguyen
(74) *Attorney, Agent, or Firm* — Harness, Dickey & Pierce, P.L.C.

(57) ABSTRACT

An objective of the present invention is to provide a method and apparatus of delivering the trigger report for MTC. According to a trigger message originated from an originator, a UE generates trigger response information corresponding to the trigger message; the UE sends a trigger report message containing the trigger response information to a first NE; the first NE extracts the trigger response information from the trigger report message and sends the trigger response information to the originator. In the prior art, the delivery report can only provide information about whether the trigger data is delivered. According to the present invention, the delivery report may also provide information on the MTC application layer, for example, even if the trigger result cannot be sent back immediately, the delivery report may can also include whether the payload data is accepted by the MTC application receives the payload data.

14 Claims, 5 Drawing Sheets

(51) Int. Cl.
*H04W 4/70* (2018.01)
*H04W 4/18* (2009.01)
*H04W 28/06* (2009.01)

(56) References Cited

U.S. PATENT DOCUMENTS

| | | | |
|---|---|---|---|
| 2014/0092808 A1* | 4/2014 | Jain | H04W 4/70 370/328 |
| 2014/0220965 A1 | 8/2014 | Yang | |
| 2014/0258434 A1* | 9/2014 | Hong | H04W 4/70 709/206 |
| 2014/0341041 A1* | 11/2014 | Velev | H04Q 3/0045 370/236 |
| 2015/0119092 A1* | 4/2015 | Yi | H04W 4/70 455/466 |

FOREIGN PATENT DOCUMENTS

| | | |
|---|---|---|
| WO | WO-2013143218 A1 | 10/2013 |
| WO | WO-2013166230 A2 | 11/2013 |

OTHER PUBLICATIONS

"3rd Generation Partnership Project; Technical Specification Group Services and System Aspects; Architecture enhancements to facilitate communications with packet data networks and applications (Release 12)", 3GPP Standard; 3GPP TS 23.682, 3rd Generation Partnership Project (3GPP), Mobile Competence Center; 650, Route Des Lucioles; F-06921 Sophia0antipolis Cedex; France, vol. SA WG2, No. V12.0.0, Dec. 13, 2013 (Dec. 13, 2013), pp. 1-33, XP050728780.

International Search Report PCT/ISA/210 for International Application No. PCT/IB2014/003139 dated Aug. 5, 2015.

* cited by examiner

METHOD AND APPARATUS OF DELIVERING THE TRIGGER REPORT FOR MACHINE TYPE COMMUNICATIONS

CROSS-REFERENCE TO RELATED APPLICATIONS

This is a National Phase of PCT Patent Application No. PCT/IB2014/003139 filed on Dec. 30, 2014, and claims priority to, European Application No. 201410008565.4, filed Jan. 8, 2014, the contents of each of which are hereby incorporated by reference in their entirety.

FIELD OF THE INVENTION

The present invention relates to the field of mobile communications technology, and more specifically, to a technique of delivering the trigger report for MTC.

BACKGROUND OF THE INVENTION

According to 3GPP TS23.682 specification, the delivery report in the existing T4 Trigger Delivery Flow can only confirm if the trigger data is received or not, i.e., the delivery report is only a confirmation on transport level because of the limitation of SMS (Short Messaging Service). The delivery report cannot transfer the information on the MTC (Machine Type Communication) application level, such as whether the MTC application accepts the trigger payload, not to mention delivering a corresponding trigger result from UE (User Equipment) to related target device. Here, the target device may be a network element (NE) or a UE, for example, MTC-IWF (MTC Interworking Function), SCS (Service Capability Server), AS (Application Server) or an origination UE for sending the trigger data.

However, it is basic requirement for MTC to deliver a trigger response to the originator, e.g., MTC-IWF, SCS, AS or origination UE for sending the trigger data. For example, in a scenario of sensor query, an effective way is necessarily sending back the query result to a trigger originator right away. According to the existing TS23.682 specification, the MTC devices have to send a separated report message back to the MTC application of the originator, which results in a plurality of extra message flows.

Therefore, in the prior art, for MTC scene, the receiver for the trigger message has to send back messages twice to the originator, i.e., the delivery report message only including confirmation of receipt of the trigger message, and the report message for the trigger result. It would undoubtedly bring more signaling overheads, thereby occupying too many channel resources.

SUMMARY

An objective of the present invention is to provide a method and apparatus of delivering the trigger report for MTC.

According to one aspect of the present invention, a method of trigger report delivery for MTC is provided, which comprises:

generating, by a UE according to a trigger message originated from an originator, trigger response information corresponding to the trigger message;

sending, by the UE, a trigger report message containing the trigger response information, to a first NE;

extracting, by the first NE, the trigger response information from the trigger report message, and sending the trigger response information to the originator.

According to another aspect of the present invention, an apparatus of trigger report delivery for MTC on a UE is provided, which comprises:

a trigger receiving module configured to receive a trigger message originated from an originator;

a response generating module configured to generate trigger response information corresponding to the trigger message;

a report sending module configured to send a trigger report message containing the trigger response information to the originator via one or more intermediate devices.

According to another aspect of the present invention, an apparatus facilitating trigger report delivery for MTC on a first NE is provided, which comprises:

a first report receiving module configured to receive a trigger report message from a UE, the trigger report message containing trigger response information corresponding to a trigger message of an originator;

a first response extracting module configured to extract the trigger response information from the trigger report message;

a first response sending module configured to send the trigger response information to the originator.

According to another aspect of the present invention, an apparatus facilitating trigger report delivery for MTC on a second NE is provided, which comprises:

a second response receiving module configured to receive trigger response information of a UE from a first NE, the trigger response information corresponding to a trigger message of an originator;

a second response sending module configured to send the trigger response information to the originator.

Compared with the prior art, the present invention provides an efficient solution to deliver the trigger response in MTC. Thereby, the MTC response can be delivered in the trigger delivery report directly instead of a separate report message.

In the prior art, the delivery report can only provide information about whether the trigger data is delivered. According to the present invention, the delivery report may can also provide information on the MTC application layer, for example, even if the trigger result cannot be sent back immediately, the delivery report may can also include whether the payload data is accepted by the MTC application receives the payload data.

The present invention can not only be applied to SMS/MTC in 3GPP such that SMS-SC (service center) can deliver the trigger response/result in a new TPDU (transfer protocol data unit) of the delivery report to the trigger originator such as the AS or an origination UE or even can deliver it directly to a target NE/UE by SMS; moreover, the present invention can also be applied to other message protocols, such as email, Instant Messaging (IM), and other text messages. For RCS (Rich Communications Services) and WebRTC (Web Real-Time Communication), the present invention can be applied in other ways, e.g., a response message containing acknowledgement and necessary report PDU (protocol data unit), wherein the data field reporting PDU may be included in the 2XX message since the SIP (Session Initiation Protocol) message does not support report PDU. Besides, the present invention can also be applicable to SOAP (Simple Object Access Protocol), Parlay X, RESTful (wherein REST is the abbreviation of Representational State Transfer), and SDN OpenFlow (wherein SDN is the abbreviation of Software Defined Network).

Saving resources such as CPU, memory, network connection for restrained MTC devices is a basic requirement of IoT (Internet of Things). The present invention satisfies this requirement more than any other prior art.

BRIEF DESCRIPTION OF THE ACCOMPANYING DRAWINGS

Through reading the following detailed depiction on the non-limiting embodiments with reference to the accompanying drawings, the other features, objectives, and advantages of the present invention will become more apparent.

Same or like reference numerals in the accompanying drawings indicate the same or corresponding components, unless otherwise indicated.

EMBODIMENTS

Hereinafter, the present invention will be further described in detail with reference to the accompanying drawings.

The present invention is applicable to MTC scene, wherein when an MTC device, such as a UE supporting MTC application, receives trigger data sent from an origination MTC device, it may generate trigger response information such as trigger response/result, and send a trigger report message containing the trigger response information back to the origination MTC device instead of a separate message to transmit the trigger response information besides the trigger report message only including confirmation of receiving the trigger data.

Apparently, 3GPP SMS/MTC is only an exemplary application scenario of the present invention. For illustration purpose, the description herein uses the trigger delivery mechanism in SMS/MTC scene as an example. However, those skilled in the art should understand that such example is only for the purpose of illustrating the present invention and should be understood as any limitation to the present invention. Any other existing or future application scenario, if applicable to the present invention, should be included within the patent protection scope of the present invention.

Figure 1:
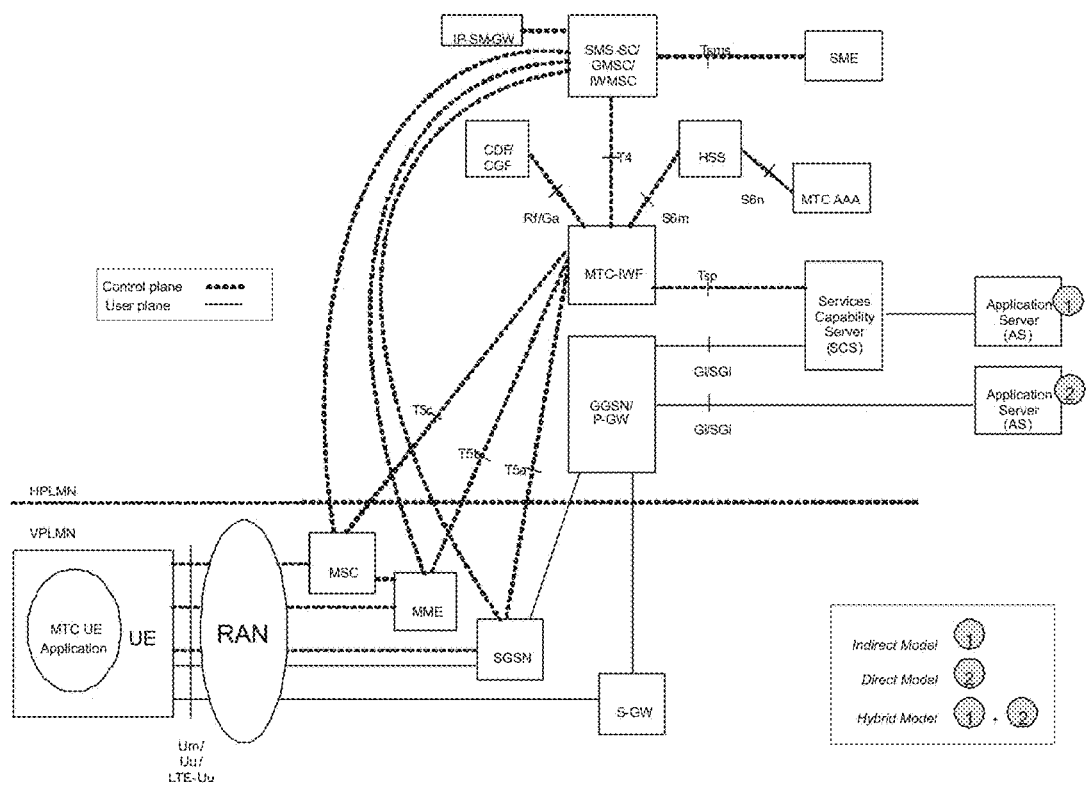
FIG. 1 shows the system architecture of MTC T4 trigger delivery mechanism in 3GPP TS23.682.

FIG. 1 shows a diagram of system architecture of MTC T4 trigger mechanism. UE is enhanced to support the delivery of the trigger response/result to SMS-SC in the delivery report message. For SMS-SC, when receiving a delivery report message of a trigger message, it detects whether the delivery report message contains trigger response/result information; if so, SMS-SC delivers the trigger response/result information to MTC-IWF via T4 interface; afterwards. MTC-IWF delivers the trigger response/result information via Tsp interface to the originator of the trigger message, such as SCS. Alternatively, SMS-SC can directly transmit the trigger response/result information as a new TPDU by SMS to the originator of the trigger message, such as the AS, origination UE or other related target NE/UE.

According to the present invention, a new process and function is proposed to deliver trigger result information such as T4 trigger result in the existing delivery report message, such that a separate extra message to report the trigger result is no more needed. Here, a new TPDU is defined to deliver the trigger response/result. On UE, when receiving the trigger message, the MTC application on the UE will generate trigger response information and contain it into the new TPDU of the delivery report message sent to the SMS-SC. The delivery report message further contains the existing delivery report data. On the T4 interface, a new "trigger response payload" parameter is defined to deliver the trigger response/result information from SMS-SC to MTC-IWF. That is, when SMS-SC detects the new TPDU in the delivery report, the new "trigger response payload" parameter is also delivered from SMS-SC to MTC-IWF via the enhanced T4 interface, besides the existing parameters such as cause code, trigger reference number, and SCS identifier. MTC_IWF delivers the "trigger response payload" parameter to SCS via Tsp interface, thereby the "trigger response payload" parameter is also defined in the Tsp interface. Alternatively, SMS-SC can introduce another function to directly deliver the trigger response/result information in the new TPDU to AS, origination UE or other related target NE/UE by SMS.

Figure 2:
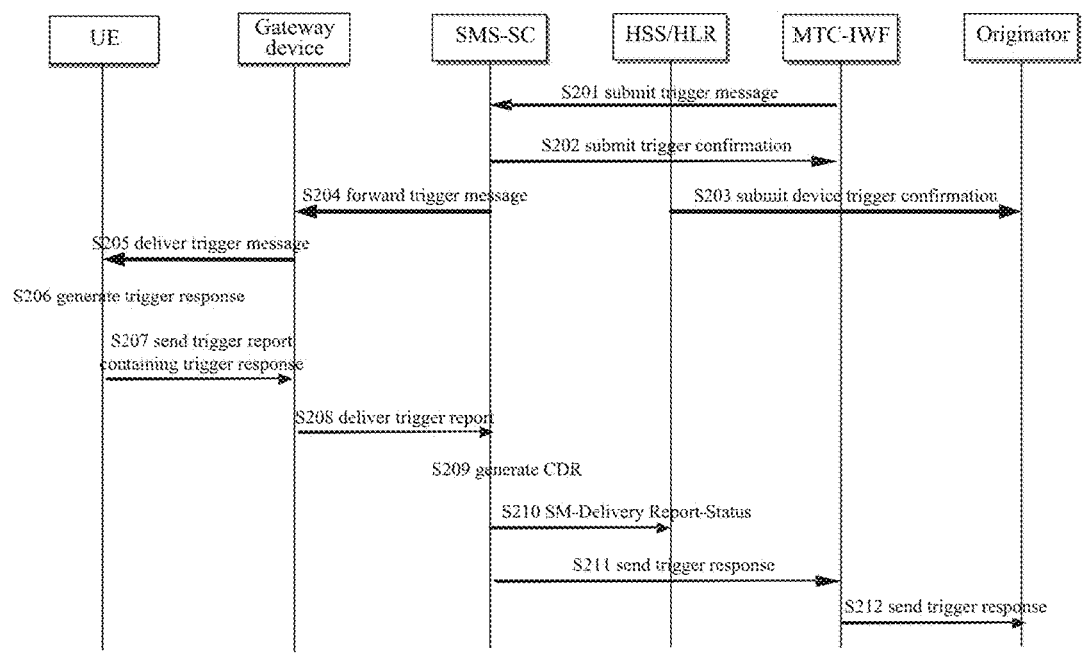
FIG. 2 shows a flowchart of a method according to one embodiment of the present invention, which specifically illustrates a trigger delivery and response process of MTC T4 trigger mechanism.

FIG. 2 shows a flow chart of trigger delivery and response for MTC T4 trigger mechanism according to one embodiment of the present invention.

As shown in FIG. 2, at step S201, MTC-IWF submits a trigger message to SMS-SC; at step S202, the SMS-SC submits a trigger confirmation message to the MTC-IWF; at step S203, the MTC-IWF sends the trigger confirmation message to a trigger originator; at step S204, the SMS-SC forwards the trigger message to a gateway device such as MSC, MME (Mobility Management Entity), SGSN (Serving GPRS Support Node), IP-SM-GW (IP-Short-Message-Gateway) etc.; at step S205, the gateway device further delivers the trigger message to a UE; at step S206, the UE generates trigger response information; at step S207, the UE takes the generated trigger response information as a new TPDU in the trigger report message and sends the trigger report message to the gateway device; at step S208, the gateway device delivers the trigger report message containing the trigger response information to the SMS-SC; at step S209, the SMS-SC generates CDR (Call Detail Record); at step S210, the SMS-SC reports SM-Delivery Report-Status to HSS (High Speed Serial)/HLR (Home Location Register); at step S211, the SMS-SC sends the trigger response information extracted from the trigger report message to the MTC-IWF; at step S212, the MTC-IWF sends the trigger response information to the originator of the trigger message, such as SCS.

SMS Enhancement

Here, the trigger report message delivered between the UE and the SMS-SC is enhanced to support the delivery of the trigger response information. It is an enhancement on SMS. A new PDU type, e.g., SMS-DELIVER-REPORT- AND-RESPONSE, is defined in the trigger report message, which can be a combination of SMS-DELIVER-REPORT and SMS-SUBMIT (defined in TS 23.040). Consider there is only one spare bit in TP-MTI (TP-Message-Type-Indicator) currently, an alternative is to enhance the MS-DELIVER-REPORT to carry the response SMS optionally, i.e., a set of optional parameters will be defined in the MS DELIVER-REPORT to carry the trigger response information.

The optional parameters include the following parameters:

Trigger response indicator, for indicating the trigger response/result in the SMS-DELIVER-REPORT. If the parameter exists, the following parameters are mandatory parameters to carry the trigger response/result.

Destination-Address, i.e., the address of a target SME SMS message Entity), which is for defining the destination address of the trigger response payload. When used to indicate the source device to which the trigger response payload is sent directly from the SMS-SC, the Destination-Address is a necessary parameter, and the detailed description can be provided in the below with reference to the description of FIG. 3.

Trigger response payload, which contains trigger response/result data. The format of the parameter should follow the trigger payload defined in TS 23.682.

Other parameters defined in the trigger message, e.g. validity period, priority, etc., should also be included in the enhanced delivery report message.

UE Enhancement

The UE should be enhanced to construct trigger response/result information in the delivery report message sent back to the trigger originator. The UE should send back the delivery report message within an allowed time range. Since the MTC message processing on UE is brief and quick, it is feasible.

When receiving the trigger message, the UE further performs the following function besides generating the existing delivery report defined in TS 23.040:

1) starting a timer to wait for response of the MTC application. The timer should be shorter in time than the timer waiting for the delivery report message.

2) adopting the parameters in the enhanced SMS-DELIVER-REPORT to construct the trigger response/result information, and send it back to the SMS-SC through delivery report message.

3) when the timer expires, sending the enhanced delivery report message.

Enhancement of T4 Interface

The message delivered between the SMS-SC and the MTC-IWF is also enhanced to support the delivery of the trigger response information. It is an enhancement on T4 interface. Besides the existing parameters such as cause code, trigger reference number, and SCS identifier, a new parameter, e.g., "trigger response payload," is defined to carry the trigger response/result information, and the format of which should follow the trigger payload defined in TS 23.682.

SMS-SC Enhancement

When receiving the enhanced delivery report message sent from the UE, the SMS will detect whether it contains trigger response information, and further, the SMS-SC will detect whether the delivery report message contains a trigger response indicator; if it contains the trigger response indicator, the SMS-SC will extract the "trigger response payload" parameter, and send it to the MTC-IWF, together with other existing parameters such as cause code, trigger reference number, and SCS identifier.

Enhancement of Tsp Interface

The MTC-IWF sends the trigger response information to the trigger originator such as SCS via Tsp interface. The Tsp interface should also define the new parameter "trigger response payload." According to TS 29.368, Tsp message Device-Notification-Request (DNR) sent from the MTC-IWF to the SCS is used to notify the delivery outcome/report of the device trigger request. Therefore, the new "trigger response message" between the MTC-IWF and the SCS can likewise use the DNR and employ a new AVP (Attribute-value pair) such as Trigger-Response AVP to deliver the trigger response payload, besides the existing AVPs in the delivery outcome/report.

MTC-IWF Enhancement

When receiving T4 message from the SMS-SC, the MTC-IWF will detect whether it contains the "trigger response payload"; if so, the MTC-IWF delivers the "trigger response payload" in the new Trigger-Response AVP through the DNR message.

Figure 3:
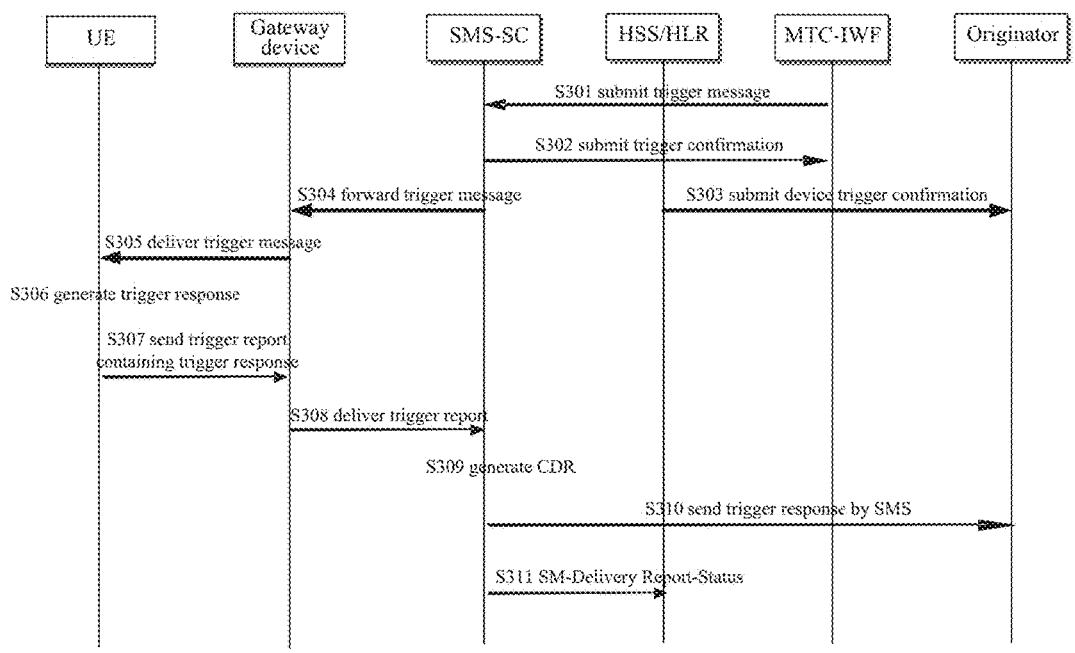
FIG. 3 shows a flowchart of a method according to another embodiment of the present invention, which specifically illustrates a trigger delivery and response process of MTC trigger mechanism.

FIG. 3 shows a flow chart of trigger delivery and response for MTC trigger mechanism according to another embodiment of the present invention.

As shown in FIG. 3, at steps S301-S309, the operations executed by respective devices are identical to the operations executed at steps S201-S209 in FIG. 2; for simplicity, they will not be detailed here, but are incorporated here by reference.

Afterwards, at step S310, the SMS-SC directly sends the trigger response information by short message to the target device, i.e., the source device of the trigger message; at step S311, the SMS-SC reports SM-Delivery Report-Status to HSS/HLR.

Here, when receiving the enhanced trigger report message from the UE, the SMS-SC will detect whether it contains the trigger response information, e.g. response SMS, if so, the SMS-SC splits the trigger response information from the trigger report message and sends it to the destination device by SMS message. The SMS message sent by the SMS-SC to the destination device is MTC SMS message; if the destination device supports the SMS interface, the SMS-SC will directly send the trigger response information to these destination devices by SMS. The destination device can be AS, origination UE or other related destination NE/UE.

The process shown in FIG. 3 only relates to UE enhancement, SMS enhancement, and SMS-SC enhancement. Here, the UE enhancement is identical to the UE enhancement depicted in FIG. 2.

Regarding the SMS enhancement, the optional parameters in the SMS-DELIVER-REPORT is also similar to the optional parameters in the SMS-DELIVER-REPORT depicted in FIG. 2, except that the SMS enhancement in the process shown in FIG. 3 requires that the SMS-DELIVER-REPORT must contain the "Destination-Address" parameter.

Regarding the SMS-SC enhancement, the SMS-SC directly delivers the "trigger response payload" to the destination device, i.e., the originator of the trigger message, via MTC SMS message. The delivery operation may be triggered by predetermined rule(s) or triggered by the "Destination-Address" parameter.

Figure 4:
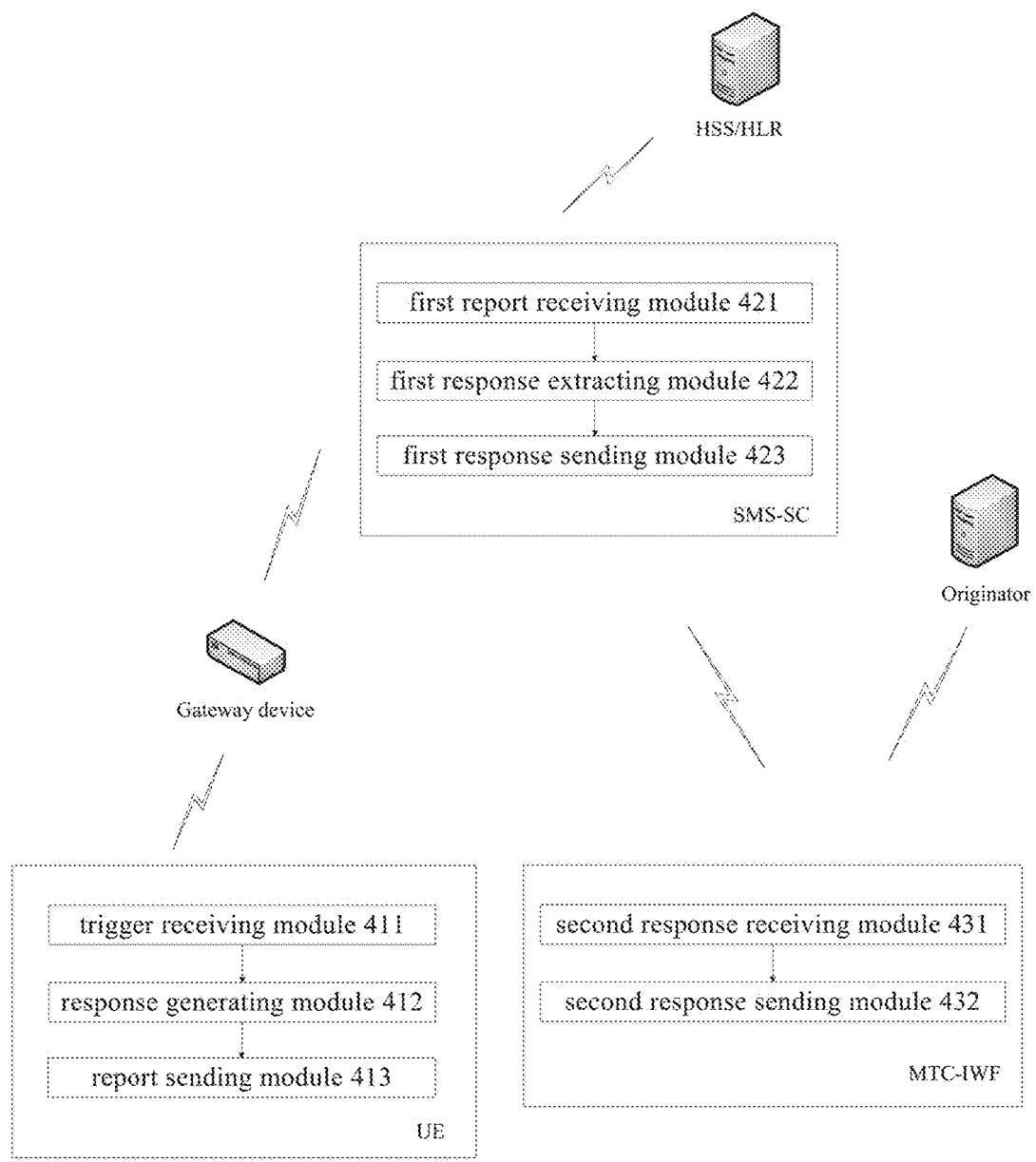
FIG. 4 shows a block diagram of an apparatus according to one embodiment of the present invention, which specifically illustrates an apparatus cooperating to implement a trigger delivery and response process of MTC T4 trigger mechanism.

FIG. 4 shows a block diagram of an apparatus according to one embodiment of the present invention, which specifically illustrates an apparatus cooperating to implement a trigger delivery and response process of MTC T4 trigger mechanism As shown in FIG. 4, the UE includes a trigger receiving module 411, a response generating module 412 and a report sending module 413; the SMS-SC includes a first report receiving module 421, a first response extracting module 422 and a first response sending module 423; the MTC-IWF includes a second response receiving module 431 and a second response sending module 432.

Specifically, after the trigger receiving module 411 on UE receives a trigger message, the response generating module 412 on UE generates the corresponding trigger response information and takes the generated trigger response information as a new TPDU in a trigger report message; the report sending module 413 on UE sends the trigger report message to SMS-SC via a gateway device such as MSC, MME (Mobility Management Entity), SGSN (Serving GPRS Support Node), IP-SM-GW (IP-Short-Message-Gateway) etc.; the first report receiving module 421 on SMS-SC receives the trigger report message; the first response extracting module 422 on SMS-SC extracts the trigger response information from the trigger report message; the first response sending module 423 on SMS-SC delivers the trigger response information to the MTC-IWF; the second response receiving module 431 on MTC-IWF receives the trigger response information; the second response sending module 432 on MTC-IWF sends the trigger response information to the originator of the trigger message, such as SCS.

SMS Enhancement

Here, the trigger report message delivered between the UE and the SMS-SC is enhanced to support the delivery of the trigger response information. It is an enhancement on SMS. A new PDU type, e.g., SMS-DELIVER-REPORT-AND-RESPONSE, is defined in the trigger report message, which can be a combination of SMS-DELIVER-REPORT and SMS-SUBMIT (defined in TS 23.040). Consider there is only one spare bit in TP-MTI (TP-Message-Type-Indicator) currently, an alternative is to enhance the MS-DELIVER-REPORT to carry the response SMS optionally, i.e., a set of optional parameters will be defined in the MS DELIVER-REPORT to carry the trigger response information.

The optional parameters include the following parameters:

Trigger response indicator, for indicating the trigger response/result in the SMS-DELIVER-REPORT. If the parameter exists, the following parameters are mandatory parameters to carry the trigger response/result.

Destination-Address, i.e., the address of a target SME (SMS message Entity), which is for defining the destination address of the trigger response payload. When used to indicate the source device to which the trigger response payload is sent directly from the SMS-SC, the Destination-Address is a necessary parameter, and the detailed description can be provided in the below with reference to the description of FIG. 3.

Trigger response payload, which contains trigger response/result data. The forma of the parameter should follow the trigger payload defined in TS 23.682.

Other parameters defined in the trigger message, e.g. validity period, priority, etc., should also be included in the enhanced delivery report message.

UE Enhancement

The UE should be enhanced to construct trigger response/result information in the delivery report message sent back to the trigger originator. The UE should send back the delivery report message within an allowed time range. Since the MTC message processing on UE is brief and quick, it is feasible.

When the trigger receiving module 411 on LE receives the trigger message, the response generating module 412 further performs the following function besides generating the existing delivery report defined in TS 23.040:

1) starting a timer to wait for response of the MTC application. The timer should be shorter in time than the timer waiting for the delivery report message.

2) adopting the parameters in the enhanced SMS-DELIVER-REPORT to construct the trigger response/result information, and send it back to the SMS-SC through delivery report message.

3) when the timer expires, sending the enhanced delivery report message by the report sending module 413.

Enhancement of T4 Interface

The message delivered between the SMS-SC and the MTC-IWF is also enhanced to support the delivery of the trigger response information. It is an enhancement on T4 is interface. Besides the existing parameters such as cause code, trigger reference number, and SCS identifier, a new parameter, e.g., "trigger response payload," is defined to carry the trigger response/result information, and the format of which should follow the trigger payload defined in TS 23.682.

SMS-SC Enhancement

When receiving the enhanced delivery report message sent from the UE, the first report receiving module 421 on SMS-SC will detect whether it contains trigger response information, and further, the first report receiving module 421 will detect whether the delivery report message contains a trigger response indicator; if it contains the trigger response indicator, the first response extracting module 422 will extract the "trigger response payload" parameter, and the first response sending module 423 on SMS-SC will send it to the MTC-IWF, together with other existing parameters such as cause code, trigger reference number, and SCS identifier.

Enhancement of Tsp Interface

The MTC-IWF sends the trigger response information to the trigger originator such as SCS via Tsp interface. The Tsp interface should also define the new parameter "trigger response payload." According to TS 9.368, Tsp message Device-Notification-Request (DNR) sent from the MTC-IWF to the SCS is used to notify the delivery outcome/report of the device trigger request. Therefore, the new "trigger response message" between the MTC-IWF and the SCS can likewise use the DNR and employ a new AVP (Attribute-value pair) such as Trigger-Response AVP to deliver the trigger response payload, besides the existing AVPs in the delivery outcome/report.

MTC-IWF Enhancement

When receiving T4 message from the SMS-SC, the second response receiving module 431 on MTC-IWF will detect whether it contains the "trigger response payload"; if so, the second response sending module 432 delivers the "trigger response payload" in the new Trigger-Response AVP through the DNR message.

Figure 5:
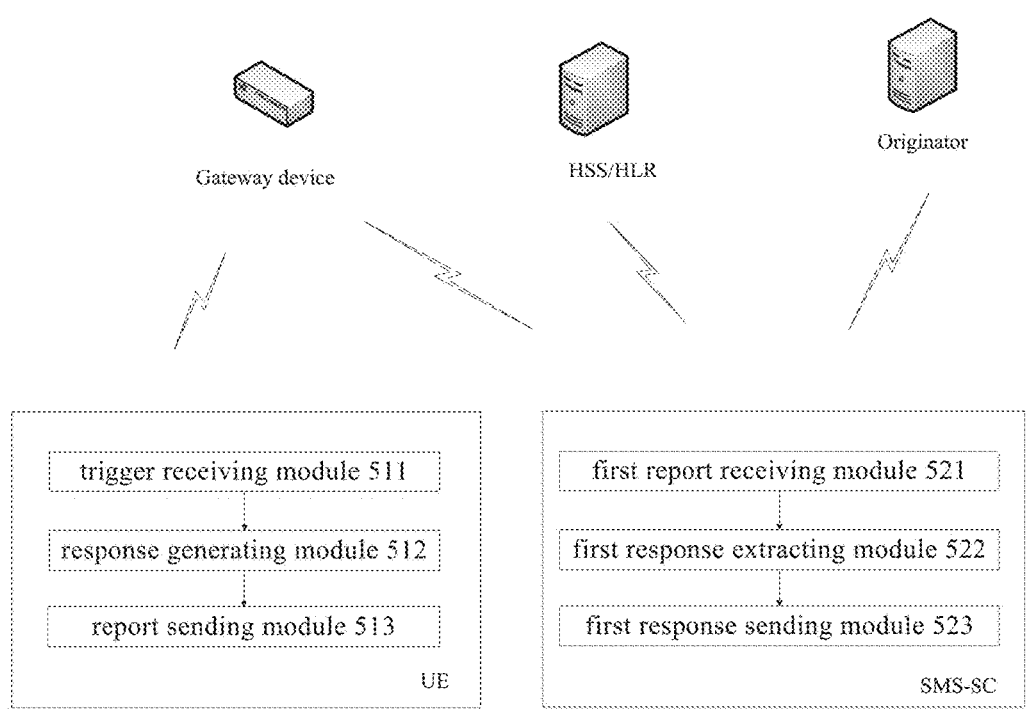
FIG. 5 shows a block diagram of an apparatus according to another embodiment of the present invention, which specifically illustrates an apparatus cooperating to implement a trigger delivery and response process of MTC trigger mechanism.

FIG. 5 shows a block diagram of an apparatus according to another embodiment of the present invention, which specifically illustrates an apparatus cooperating to implement a trigger delivery and response process of MTC trigger mechanism.

As shown in FIG. 5, the UE includes a trigger receiving module 511, a response generating module 512 and a report sending module 513; the SMS-SC includes a first report receiving module 521, a first response extracting module 522 and a first response sending module 523.

Specifically, after the trigger receiving module 511 on UE receives a trigger message, the response generating module 512 on UE generates the corresponding trigger response information and takes the generated trigger response information as a new TPDU in a trigger report message; the report sending module 513 on UE sends the trigger report message to SMS-SC via a gateway device such as MSC, MME (Mobility Management Entity), SGSN (Serving GPRS Support Node), IP-SM-GW (IP-Short-Message-Gateway) etc.; the first report receiving module 521 on SMS-SC receives the trigger report message; the first response extracting module 522 on SMS-SC extracts the trigger response information from the trigger report message; the first response sending module 523 on SMS-SC directly sends the trigger response information by short message to the target device, i.e., the source device of the trigger message.

Here, when receiving the enhanced trigger report message from the UE, the first report receiving module 521 on SMS-SC will detect whether it contains the trigger response information, e.g. response SMS, if so, the first response extracting module 522 splits the trigger response information from the trigger report message and the first response sending module 523 sends it to the destination device by SMS message. The SMS message sent by the first response sending module 523 on SMS-SC to the destination device is MTC SMS message; if the destination device supports the SMS interface, the first response sending module 523 will directly send the trigger response information to these destination devices by SMS. The destination device can be AS, origination UE or other related destination NE/UE.

The enhancement of delivery report implemented by devices in FIG. 5 only relates to UE enhancement, SMS enhancement, and SMS-SC enhancement. Here, the UE enhancement is identical to the UE enhancement depicted in FIG. 4.

Regarding the SMS enhancement, the optional parameters in the SMS-DELIVER-REPORT is also similar to the optional parameters in the SMS-DELIVER-REPORT depicted in FIG. 4, except that the SMS enhancement in the process shown in FIG. 5 requires that the SMS-DELIVER-REPORT must contain the "Destination-Address" parameter.

Regarding the SMS-SC enhancement, the first response sending module 523 on SMS-SC directly delivers the "trigger response payload" to the destination device, i.e., the originator of the trigger message, via MTC SMS message. The delivery operation may be triggered by predetermined rule(s) or triggered by the "Destination-Address" parameter.

It should be noted that the present invention may be implemented in software or a combination of software and hardware; for example, it may be implemented by an ASIC (Application Specific Integrated Circuit), a general-purpose computer, or any other similar hardware devices.

The software program of the present invention may be executed by a processor to implement the above steps or functions. Likewise, the software program of the present invention (including relevant data structure) may be stored in a computer readable recording medium, for example, a RAM memory, a magnetic or optical driver, or a floppy disk, and other similar devices. Besides, some steps or functions of the present invention may be implemented by hardware, for example, a circuit cooperating with a processor to execute various functions or steps.

Additionally, a portion of the present invention may be applied as a computer program product, for example, a computer program instruction, which, may invoke or provide a is method and/or technical solution according to the present invention through operations of the computer when executed by the computer. Further, the program instruction invoking the method of the present invention may be stored in a fixed or mobile recording medium, and/or transmitted through broadcast or data flow in other signal bearer media, and/or stored in a working memory of a computer device which operates based on the program instruction. Here, one embodiment according to the present invention comprises an apparatus comprising a memory for storing a computer program instruction and a processor for executing the program instruction, wherein when the computer program instruction is executed by the processor, the apparatus is triggered to run the methods and/or technical solutions according to a plurality of embodiments of the present invention.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims instead of the above description, and all variations intended to fall into the meaning and scope of equivalent elements of the claims should be covered within the present invention. No reference signs in the claims should be regarded as limiting of the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A method of trigger report delivery for MTC, wherein the method comprises:
    generating, by a UE according to a trigger message originated from an originator, trigger response information corresponding to the trigger message;
    sending, by the UE, a trigger report message containing the trigger response information and a confirmation of receiving the trigger message originated from the originator, to a first NE;
    extracting, by the first NE, the trigger response information from the trigger report message, and sending the trigger response information to the originator,
    wherein the trigger response information is further sent directly to the originator from the first NE by SMS message.

2. The method according to claim 1, wherein the first NE is SMS-SC.

3. The method according to claim 1, wherein the trigger report message is further sent from the first NE to the originator via a second NE.

4. The method according to claim 3, wherein the first NE is SMS-SC and the second NE is MTC-IWF;
    wherein the trigger report message is further sent from the SMS-SC to the MTC-IWF via T4 interface, so as to be sent from the MTC-IWF to the originator via Tsp interface.

5. An apparatus of trigger report delivery for MTC on a UE, wherein the apparatus comprises:
    a trigger receiving module configured to receive a trigger message originated from an originator;

a response generating module configured to generate trigger response information corresponding to the trigger message;

a report sending module configured to send a trigger report message containing the trigger response information and a confirmation of receiving the trigger message originated from the originator to the originator via one or more intermediate devices, the report sending module configured to send the trigger report message containing the trigger response information to a first NE, such that the first NE extracts the trigger response information from the trigger report message and sends the trigger response information directly to the originator by SMS message.

6. The apparatus according to claim 5, wherein the trigger response information at least comprises the following information:

trigger response indicator;
trigger response data.

7. The apparatus according to claim 5, wherein the first NE is SMS-SC.

8. The apparatus according to claim 5, wherein the intermediate devices comprise and a second NE;

wherein the report sending module is further configured to:
send the trigger report message containing the trigger response information to the first NE, such that the first NE extracts the trigger report information from the trigger report message and sends the trigger response information to the second NE, so as to be sent from the second NE to the originator.

9. The apparatus according to claim 8, wherein the first NE is SMS-SC and the second NE is MTC-IWF;

wherein the trigger response information is further extracted from the trigger report message and sent by the SMS-SC to the MTC-IWF via T4 interface, so as to be sent from the MTC-IWF to the originator via Tsp interface.

10. An apparatus facilitating trigger report delivery for MTC on a first NE, wherein the apparatus comprises:

a memory configured to store instructions; and
a processor configured to execute the instructions to,
receive a trigger report message from a UE, the trigger report message containing trigger response information corresponding to a trigger message of an originator, and a confirmation of receiving the trigger message originated from the originator;
extract the trigger response information from the trigger report message;
send the trigger response information directly to the originator by SMS message.

11. The apparatus according to claim 10, wherein the first NE is SMS-SC.

12. The apparatus according to claim 10, wherein the processor is further configured to:
send the trigger report message to the originator via a second NE.

13. An apparatus facilitating trigger report delivery for MTC on a second NE, wherein the apparatus comprises:

a memory configured to store instructions; and
a processor configured to execute the instructions to,
receive trigger response information of a UE from a first NE, the trigger response information corresponding to a trigger message of an originator, and a confirmation of receiving the trigger message;
send the trigger response information separately and directly to the originator by SMS message.

14. The apparatus according to claim 13, wherein the first NE is a gateway device, and the second NE is SMS-SC.

* * * * *